United States Patent [19]

Krajewski

[11] 4,402,076
[45] Aug. 30, 1983

[54] TWO WIRE F.D. MULTIPLEX SYSTEM

[75] Inventor: Zdzislaw A. A. Krajewski, Ajax, Canada

[73] Assignee: Bayly Engineering Limited, Ajax, Canada

[21] Appl. No.: 222,904

[22] Filed: Jan. 5, 1981

[30] Foreign Application Priority Data

May 15, 1980 [CA] Canada ............................... 352009

[51] Int. Cl.³ .............................................. H04L 5/14
[52] U.S. Cl. ...................................... 370/30; 370/120
[58] Field of Search ................. 370/69.1, 120, 30, 119

[56] References Cited

U.S. PATENT DOCUMENTS

2,328,450  8/1943  Hagen ................................... 370/30
4,236,244  11/1980  Strehl ................................... 370/30

Primary Examiner—Glen R. Swann, III
Attorney, Agent, or Firm—Wenderoth, Lind & Ponack

[57] ABSTRACT

A system comprises two kinds of multiplex stations connected by two wire lines and distinguished by two different predetermined frequency basebands each of which consists of predetermined frequencies for dividing the multiplex channels. The multiplex stations are provided with conversion means in their respective transmit paths so as to convert their own basebands to the different ones of the other multiplex stations connected and vice-versa. The system preferably provides generalized units in both kinds of multiplex stations and is simpler than a known one which uses the same basebands in all multiplex stations and converts the baseband before and after transmitting.

8 Claims, 9 Drawing Figures

TWO WIRE F.D. MULTIPLEX SYSTEM

BACKGROUND OF THE INVENTION

This invention relates to a two-wire frequency division multiplex system.

A two-wire frequency division multiplex system enables the transmission of multi-channel telephone messages in both directions on the same pair of wires by using different frequency bands for the transmitting and the receiving directions. The frequency bands are divided into smaller channel bands each of which contains the modulated information of a predetermined one of the multiplexed channels respectively.

Some existing two-wire frequency division multiplex systems comprise two terminal stations A and B, connected by a two wire line, which operate on the same frequency channels (baseband) but each of the stations contains additional frequency conversion equipment connected to either the transmit or the receive line terminals. Thus, station A may have its transmission converted to a different frequency band (sub-group) to be sent over the line and converted back to the original baseband for reception by station B. The process may be reversed by reconnecting the converter sections at both the terminal stations. A common sub-group carrier is used for both conversions.

Due to the narrow choice of sub-groups, it may be difficult to achieve the up and down conversion with sufficient degree of linearity such as to avoid generation of intermodulation products which would interfere with operation of the system. The problem may be particularly acute when close harmonics of one sub-group fall inside the frequency band of the other.

Further, conventional frequency division multiplex systems suffer from higher distortion and interference in one direction than in the other because a signal from station A to station B has to pass through two conversion stages before reaching the recipient, whereas a return signal from B to A will be received directly on the baseband frequency. Thus conversion stages have to be built to exacting specifications in order to guarantee the minimum quality standard for both directions.

SUMMARY OF THE INVENTION

The present invention provides a simpler two-wire frequency division multiplex system which comprises first and second kinds of multiplex stations connected by two-wire lines, and distinguished by means to both produce and to receive a predetermined one of two different predetermined frequency basebands each of which consists of predetermined frequencies for dividing the multiplex channels, said first kind of multiplex stations including transmit means having conversion means to covert their own basebands to the different basebands of the second kind of multiplex stations and vice-versa.

In the said configuration signals transmitted in either direction pass through only one frequency converter to divide the transmitted and received frequencies, thereby reducing noise and intermodulation and allowing for a less expensive type of converter. The conversion equipment can be operated at a constant and optimum level, thereby allowing the mixers to be properly balanced and further reducing the harmonic and intermodulation content of the transmitted spectrum. Further, the two multiplex stations may be identical as regards layout and wiring, particularly when employing multiplex equipment with a fixed pre-modulation frequency, where interchange of the station functions may be accomplished simply by interchanging the baseband carrier frequency generators and the filter terminals of the hybrid line combiners.

BRIEF DESCRIPTION OF THE DRAWINGS

The invention will now be further discussed in conjunction with the accompanying drawings, in which.

DESCRIPTION OF THE PREFERRED EMBODIMENTS

Figure 1:
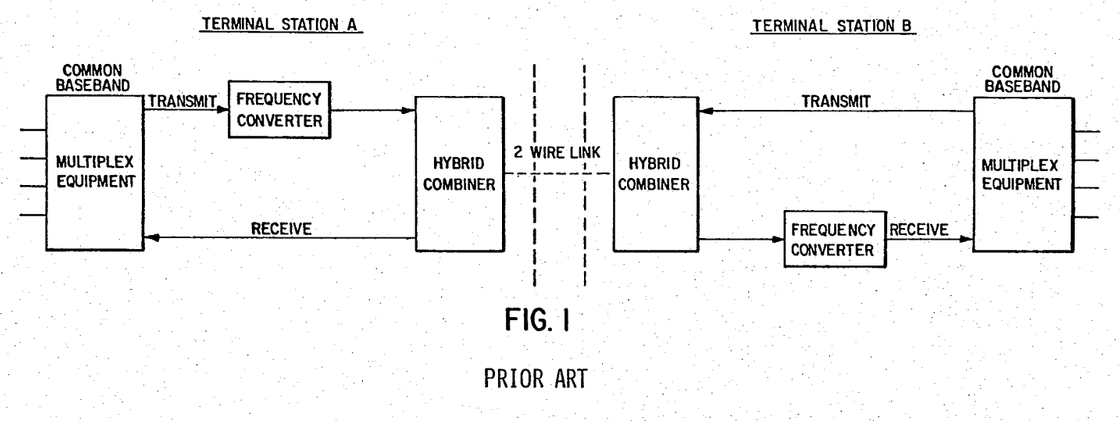
FIG. 1 is a block diagram illustrating the conventional two-wire frequency division multiplex system with conventional frequency conversion.
Figure 2:
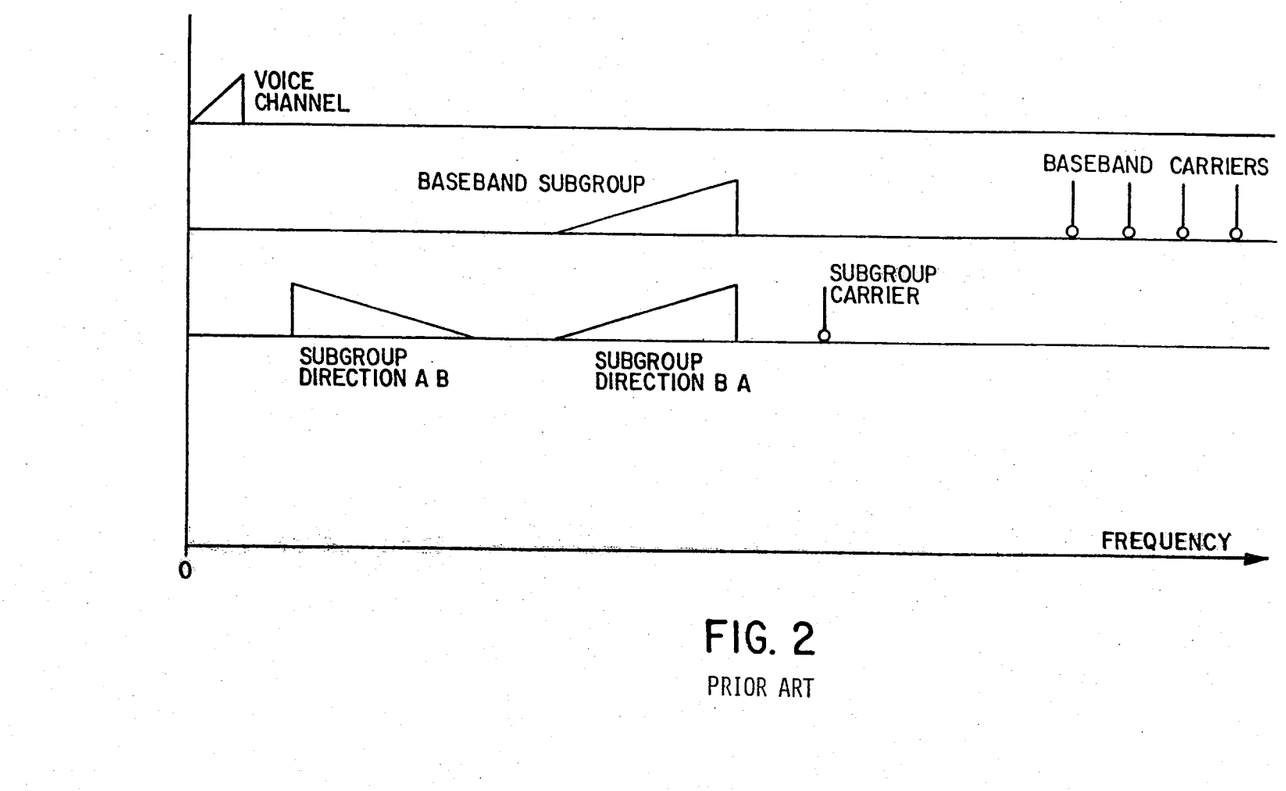
FIG. 2 is a spectrum diagram of the frequencies used in the conventional two-wire frequency division multiplex system of FIG. 1.

Referring to FIG. 1 and FIG. 2 there is shown a conventional two-wire frequency division multiplex system which provides the same baseband frequencies in terminal station A and in terminal station B, and converts this baseband in the transmit path of terminal station A and reconverts the converted baseband in the received path of terminal station B. The frequency spectrum diagram of FIG. 2 shows the voice channel being first converted by the baseband carriers in order to get the baseband sub-group which contains the particular channel frequency bands each of which is achieved by modulation of its predetermined baseband carrier. After a second conversion using sub-group carrier frequencies the complete baseband is converted to another frequency band labelled in the spectrum diagram as sub-group direction AB. After the third conversion of the baseband in the receive path of the terminal station B the normal baseband of the terminal station is obtained and labelled as baseband sub-group or sub-group direction BA. This conventional two-wire system has the above mentioned disadvantages.

Figure 3:
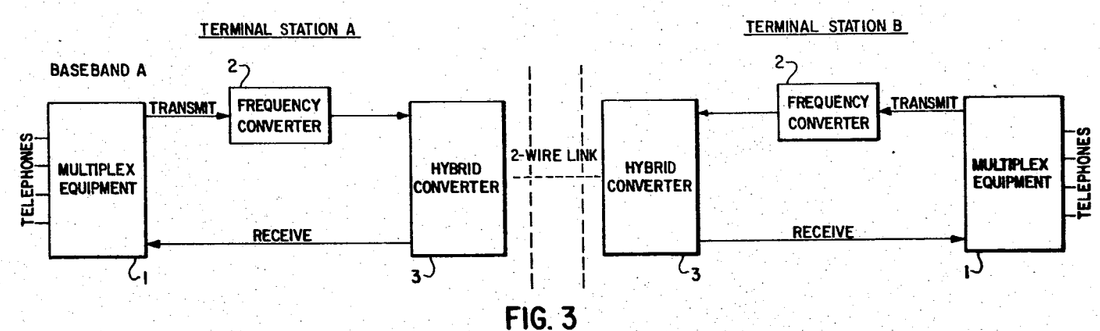
FIG. 3 is a block diagram of a two-wire frequency division multiplex system according to the invention.

FIG. 3 shows the improved two-wire frequency division multiplex system in accordance with the invention. In each of the terminal stations A and B only one conversion of the complete baseband is performed by the frequency converters placed in the transmit path of each station.

Figure 4:
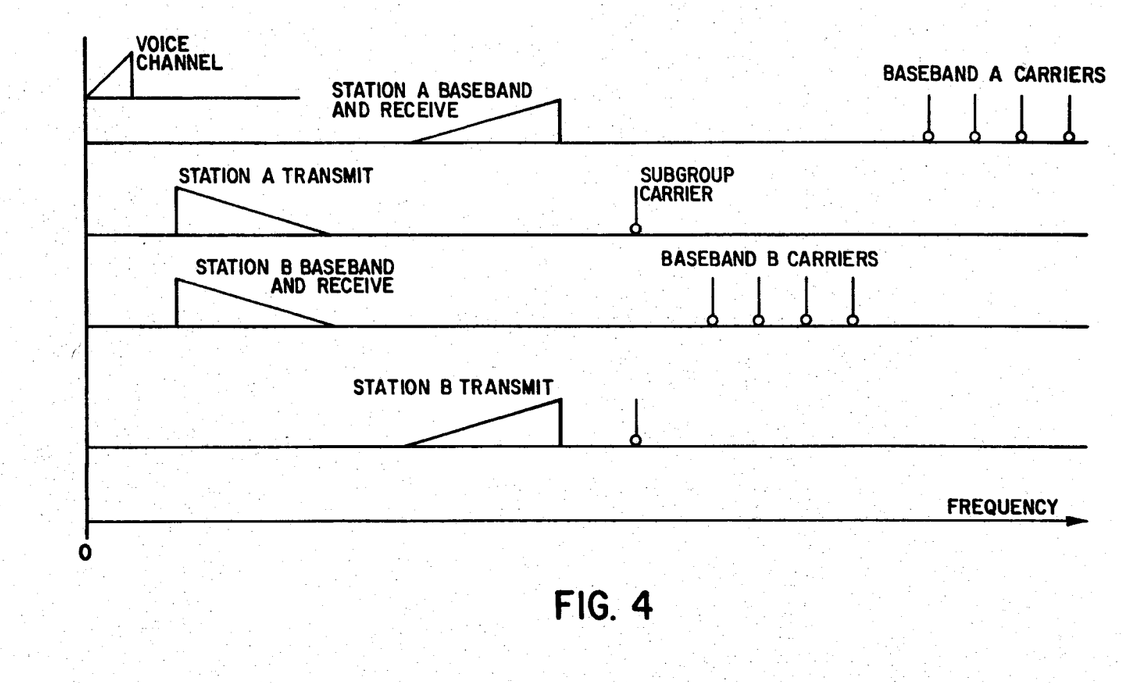
FIG. 4 is a frequency spectrum diagram of a two-wire frequency division multiplex system according to the invention and as shown in FIG. 3.

As shown in the frequency spectrum diagram of FIG. 4 station A and station B have two different basebands produced by the baseband A carriers and the baseband B carriers which are different for both stations. The same sub-group carrier frequency is provided in station A and station B to convert their own basebands to those of the other terminal stations. For example, the station A baseband and receive baseband is converted to the station A transmit baseband being the equivalent of the station B baseband and received baseband. Similarly, the station B transmit baseband is equivalent to the station A baseband and received baseband.

Figure 5:
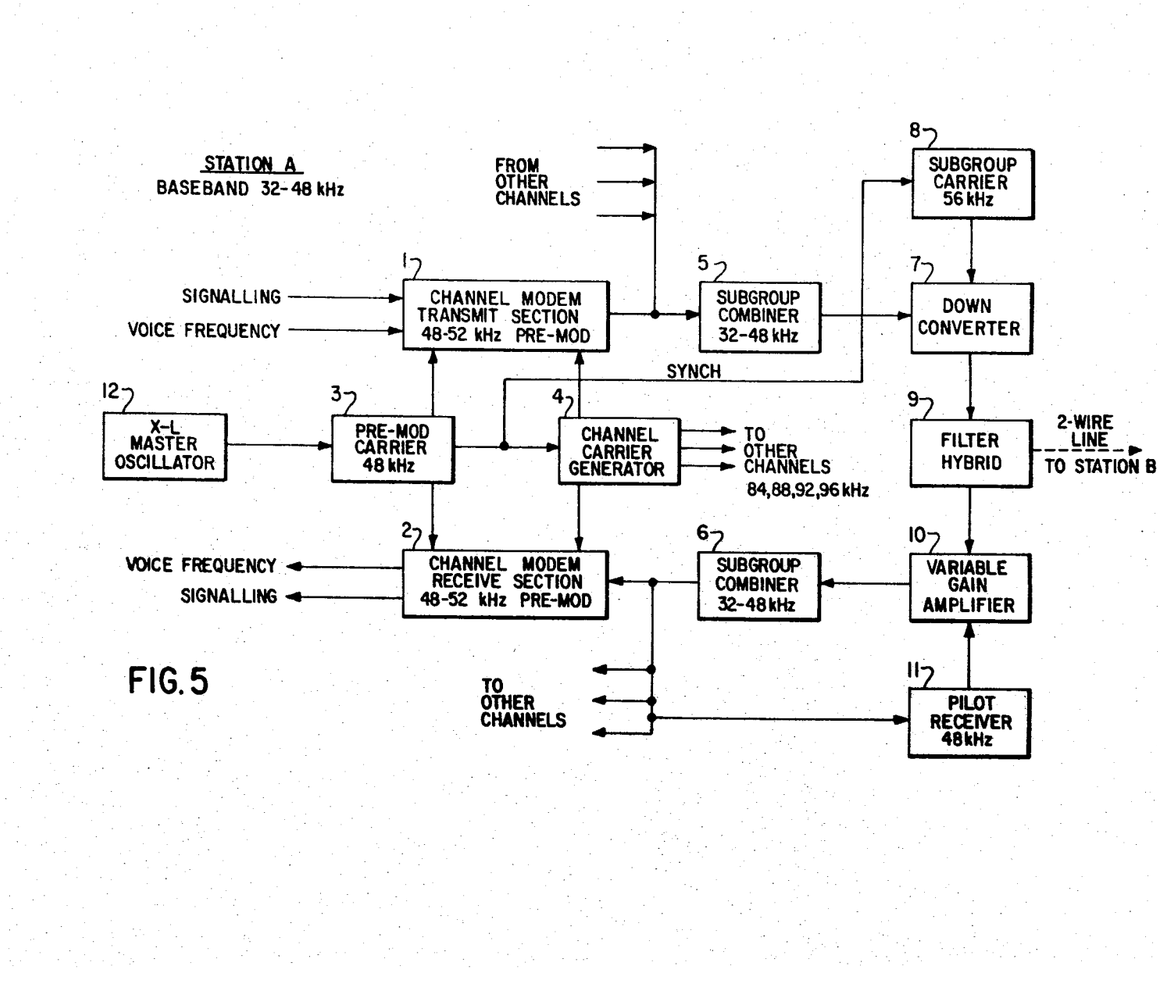
FIG. 5 is a simplified block diagram of station A of the two-wire frequency division multiplex system according to the invention.
Figure 6:
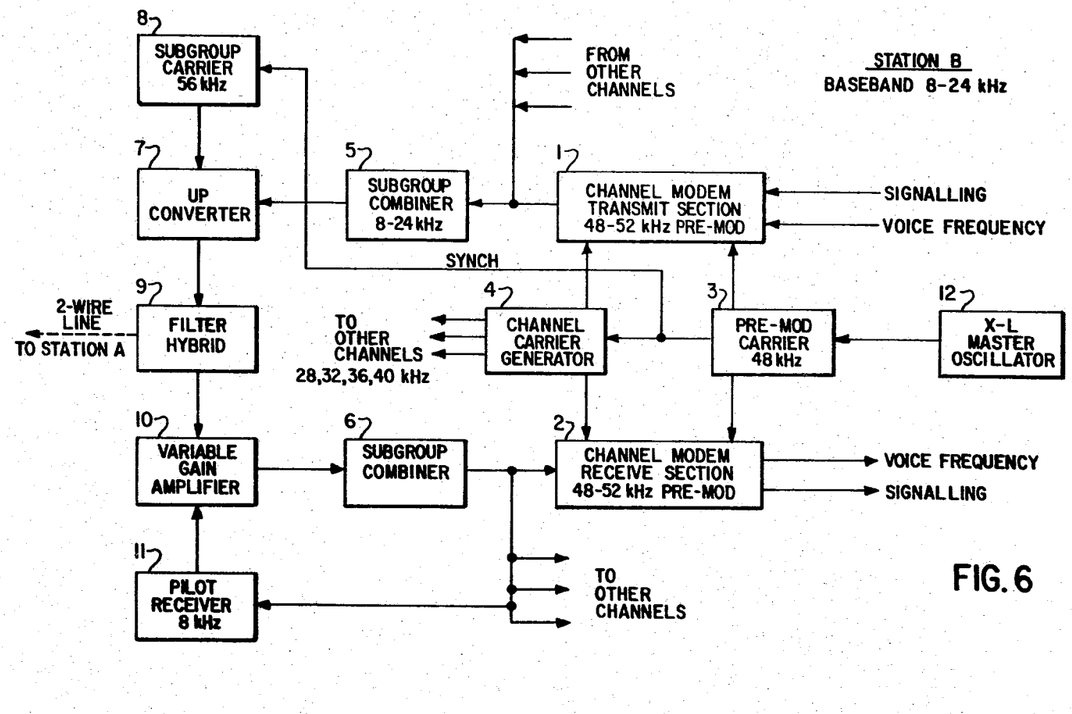
FIG. 6 is a simplified block diagram of station B with different frequency basebands in comparison to Station A in the two-wire frequency division multiplex system according to the invention.

In a particular embodiment of this invention illustrated in FIG. 5 and FIG. 6, station A is made to operate with four channels in the baseband of 32-48 kHz with station B operating with four channels in the baseband of 8-24 kHz.

Each station is made up of the multiplex equipment, converter, hybrid network and pilot facilities. The multiplex equipment employed for this purpose is of a double conversion type, utilizing a pre-modulation band of 48-52 kHz and a pre-modulation carrier of 48 kHz.

With reference to FIG. 5 and FIG. 6, the multiplex equipment comprises: four identical channel modems with transmit section (1) and receive section (2) each, one pre-modulation carrier generator of 48 kHz (3), four-channel carrier generators (4) selected for frequencies of 84, 88, 92 and 96 kHz for station A and 28, 32, 36 and 40 kHz for station B and one sub-group combiner each for transmit (5) and receive (6) directions tuned to the station baseband frequencies (32-48 kHz for station A and 8-24 kHz for station B).

The frequency converter (7) is in the transmit path (down-converter in station A and up-converter in station B) which is injected with a sub-group carrier of 56 kHz for the generator (8).

A separation filter hybrid network (9) selects the frequencies of the respective basebands of the receive and transmit paths connected to the two-wire line.

A variable gain amplifier (10) in the receive path is controlled by the output of the pilot receiver (11) operating at 48 kHz in station A and at 8 kHz in station B serving the purpose of compensation for the variable line losses.

All carrier generators including the pilots are phase-locked to a common, crystal controlled master oscillator (12) with sufficient long term stability to make the operation of the two stations A and B independent. Facilities for alignment of the master oscillators are omitted for clarity.

Figure 7:
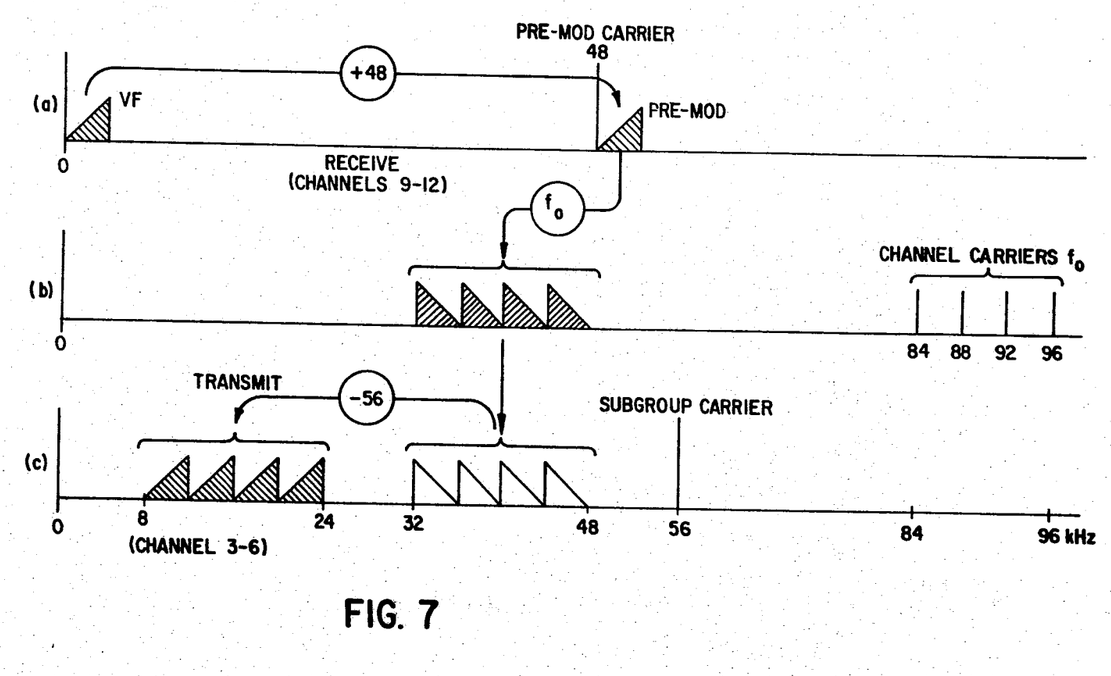
FIG. 7 is a spectrum diagram of the configuration of station A according to the invention.

FIG. 7 shows the frequency spectrum diagram of the configuration of station A in accordance with the invention. Referring to line (a), the voice frequencies VF are first converted by the pre-mod carrier of 48 kHz and then converted by the channel carriers or baseband carriers of 84, 88, 92 and 96 kHz, line (b), to achieve the predetermined baseband of station A within the frequencies of 32-48 kHz. In order to be transmitted the baseband of station A is converted, line (c), by the sub-group carrier frequency of 56 kHz to form the baseband of station B containing the frequencies of 8-24 kHz.

Figure 8:
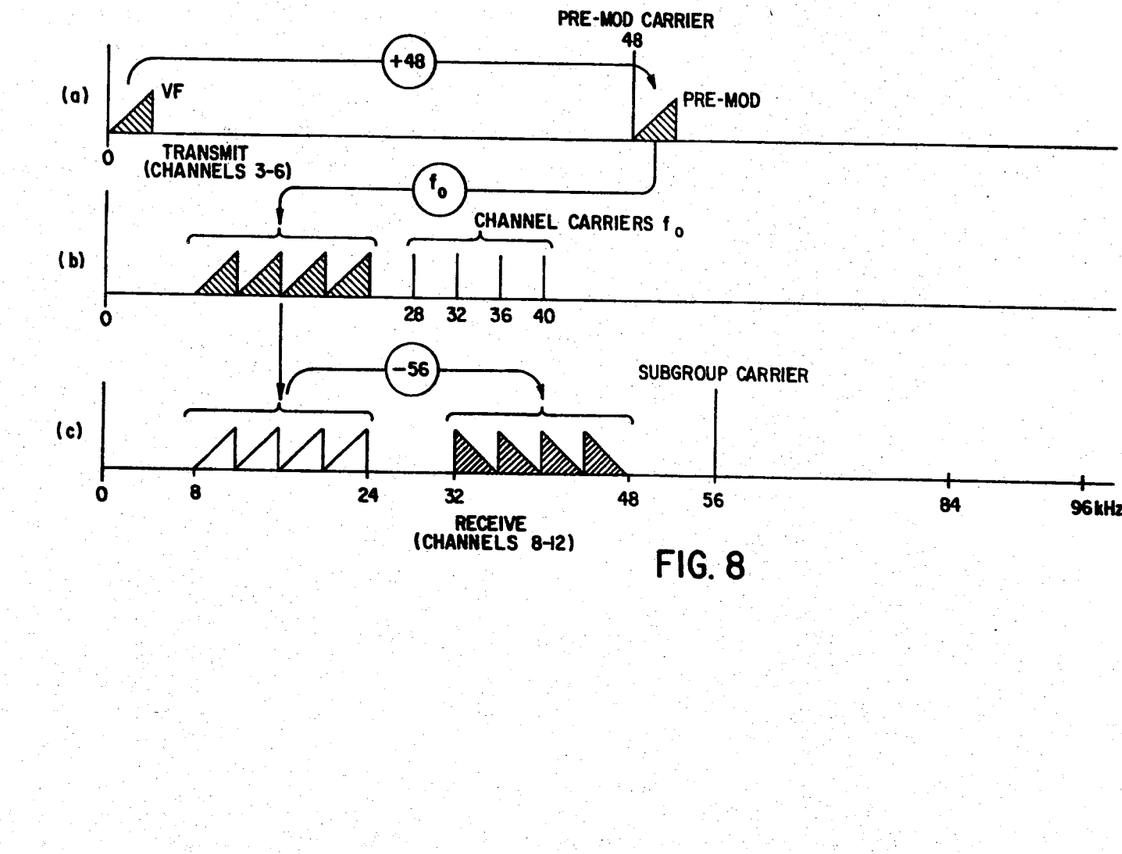
FIG. 8 is a spectrum diagram of the configuration of station B according to the invention.

FIG. 8 shows the frequency spectrum diagram of the configuration of station B according to the new multiplex system. The voice frequencies VF are at first converted, line (a), by the pre-mod carrier frequency of 48 kHz as in station A. to achieve the predetermined baseband of station B in the frequencies of 8-24 kHz further conversion is performed by the channel carrier frequencies of configuration station B with the frequencies of 28-40 kHz, line (b). Thus, the different basebands of station A and station B are only composed by the different channel carrier frequencies of both stations. Before transmitting the baseband of station B is converted by the same sub-group carrier frequency of 56 kHz to that of station A with the frequencies of 32-48 kHz. A preferable choice of the frequencies of both basebands of 8-24 kHz and 32-48 kHz allows the use of a single sub-group carrier frequency of 56 kHz in both stations A and B.

Figure 9:
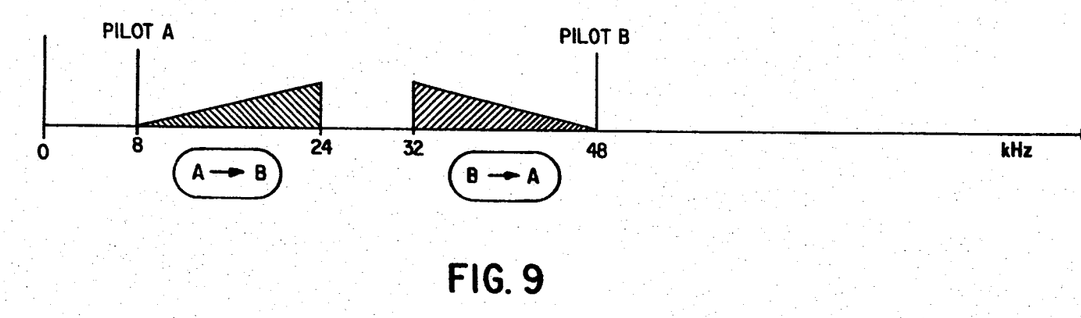
FIG. 9 is a spectrum diagram of the transmission spectrum together with the pilot frequencies according to the invention.

Regarding FIG. 9 there is shown the complete transmission frequency spectrum from station A to station B and vice-versa. The pilot frequencies are added at the extreme ends of the spectrum, one just below the low frequency end of the lower baseband and one just above the high frequency end of the higher baseband. They can be mixed with and separated from the signals in a conventional manner. Provision of two pilot frequencies so placed ensures better compensation of line characteristics throughout the transmission spectrum.

The 2-wire network system employing the improved configuration is not limited to two terminals A and B. Generally, the applications may be extended to a chain of links:

A—B—A—B—etc.

or as a star:

or to a combination thereof, provided type A stations will link directly with type B stations only.

Communication between similar type terminals can be established by voice frequency cross-channel looping at the intermediate stations.

What I claim as my invention is:

1. A two-wire frequency division multiplex system comprising first and second kinds of multiplex stations connected by two-wire lines, and distinguished by means to both produce and to receive a predetermined one of two different predetermined frequency basebands each of which consists of predetermined frequencies for dividing the multiplex channels, said first kind of multiplex stations including transmit means having conversion means to convert their own basebands to the different basebands of the second kind of multiplex stations and vice-versa.

2. A multiplex system as claimed in claim 1, wherein each means to produce a frequency baseband comprises means to convert channel information frequencies so as to achieve adjacent channel frequency bands of the same size in the respective frequency baseband of each multiplex station, and means to combine the particular channel frequency bands in said baseband.

3. A multiplex system as claimed in claim 2, in which said means to convert the channel frequency bands include transmit channel modems and different channel carrier frequency generators which supply each of the transmit channel modems with a different channel carrier frequency dependent on the predetermined frequency baseband of the multiplex station and the appropriate channel, each of said transmit channel modems including means to modulate the appropriate channel carrier frequency by the channel frequencies respectively to achieve a particular channel frequency band in its predetermined frequency baseband.

4. A multiplex system as claimed in claim 3, wherein said transmit channel modems are connected to means supplying all said transmit channel modems with the same pre-modulation carrier frequency to be modulated by the voice frequency or the signalling of the appropriate channel.

5. A multiplex system as claimed in claim 1 wherein said means to receive one of two different basebands comprise means to filter their own baseband out of incoming frequencies, means to amplify the received signals, means to supply said means to amplify with the respective one of two pilot frequencies, one of which being located at each end of the system's transmitted frequency spectrum, means to combine the channel frequency band in the predetermined baseband and means to demodulate the voice frequency or the signalling of each of the channels.

6. A multiplex system as claimed in claim 5 wherein said means to demodulate the voice frequency or the signalling consists of the same receive channel modems for all channels and all basebands, each of said receive channel modems being supplied with said different channel carrier frequency by said channel carrier frequency generator, and with said pre-modulation frequency to convert each of the channel frequency bands and to demodulate the voice frequency or the signalling.

7. A multiplex system as claimed in claim 1 wherein said conversion means include in all said multiplex stations identical means to convert its own baseband either to the higher or to the lower baseband frequencies, and a subgroup carrier generator to supply said means to convert its own baseband with the same subgroup carrier frequency to be modulated by its own baseband frequencies, and filter means to select either the higher or lower baseband frequencies.

8. A multiplex system as claimed in claim 6 wherein said multiplex stations comprise four of said channels being multiplexed, two basebands of 32–48 kHz and 8–24 KHz and two pilot frequencies of 48 KHz and 8 KHz for said stations respectively with a total spectrum occupancy of 8–48 KHz.

* * * * *